May 5, 1931.  C. V. EAST  1,803,934
SAW SHARPENER
Filed Aug. 23, 1927
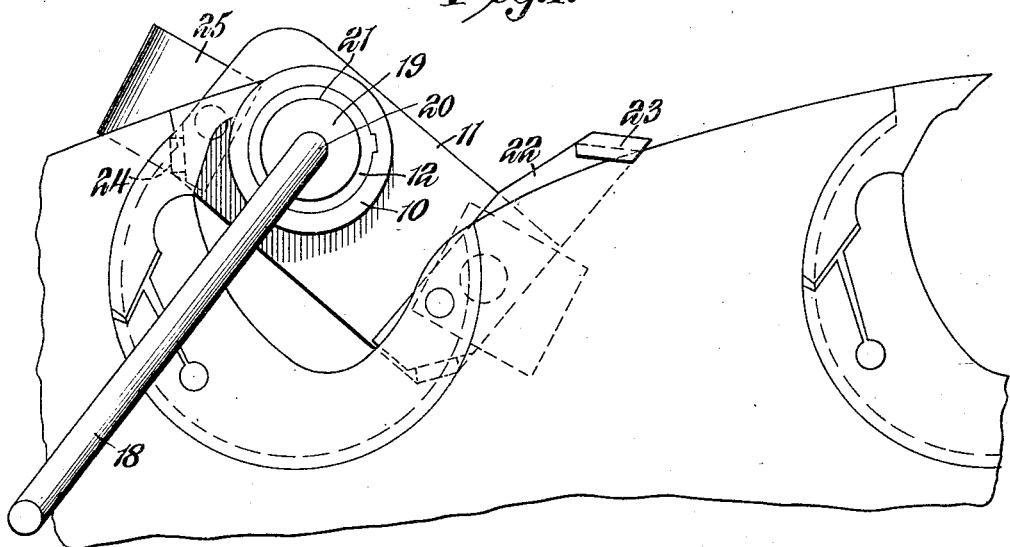
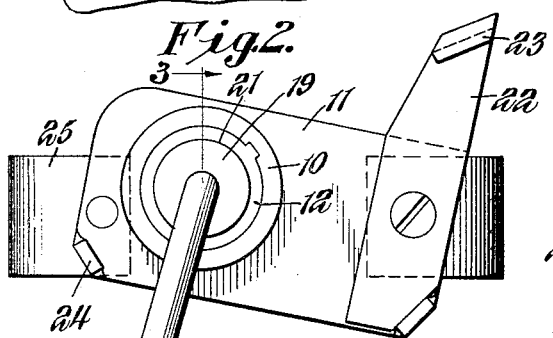
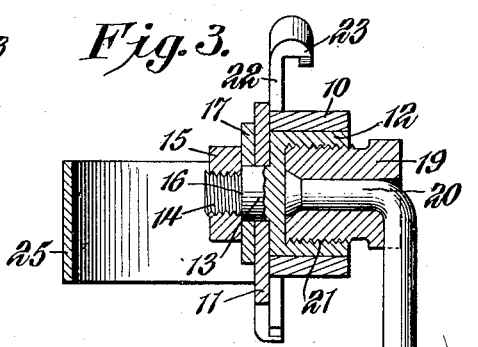
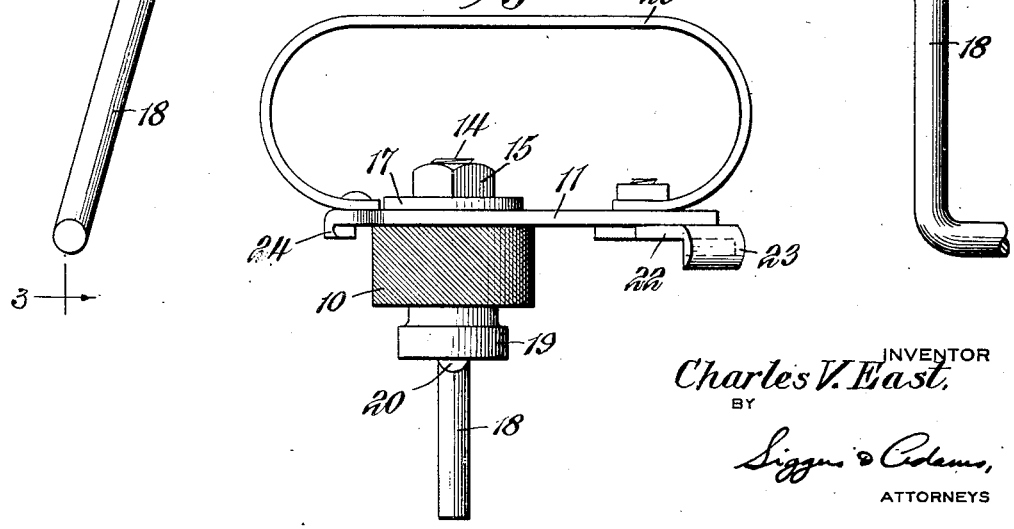
INVENTOR
Charles V. East,
BY
ATTORNEYS Patented May 5, 1931

1,803,934

UNITED STATES PATENT OFFICE

CHARLES V. EAST, OF MOLSON, WASHINGTON

SAW SHARPENER

Application filed August 23, 1927. Serial No. 214,953.

This invention relates to saw sharpeners and aims among other objects to provide an improved sharpening device particularly adapted to grind or sharpen the teeth of circular saws such as are used in sawmills and the like.

Referring to the drawings, in which one illustrative embodiment of the invention is shown, Fig. 1 is a fragmentary side elevation showing the sharpener applied to a tooth of a circular saw;

Fig. 2 is a side elevation of the sharpener shown in Fig. 1;

Fig. 3 is a sectional view taken on the line 3—3 of Fig. 2; and

Fig. 4 is a top plan view of the sharpener.

When the removable teeth of circular saws become dull, it is necessary either to resharpen them or to replace them with new ones. It has been found that if the teeth are sharpened by means of flat files or grinders producing plane undercut surfaces, they are apt to cut a zig-zag path in a log. This is particularly true if the log is frozen. This invention aims to provide a simple grinding device to sharpen the teeth on arcs and thereby produce very sharp cutting edges adapted to cut straight.

Referring particularly to the drawings, there is shown a grinding wheel 10 in the form of a band file journaled to rotate in a plate 11 by means of a supporting mandrel 12, which has a cylindrical boss 13 projecting through an opening in the plate and having a screw-threaded end 14 to receive a nut 15. Referring to Fig. 3, the nut 15 is adapted to be screwed on the screw-threaded portion against a shoulder 16 and a washer 17 is interposed between it and the side of the plate. The grinding wheel is adapted to be rotated either by power or manually. Herein there is shown a hand crank 18 connected to the mandrel 12 by means of a plug 19 which has an opening for the L-shaped end 20 of the handle and is adapted to be screwed in a threaded opening 21 in the mandrel.

To guide the grinding wheel so that its axis will lie parallel with the axis of the circular saw, the plate 11 is sufficiently long to span the tooth gap in the saw and is shown as having a clip or rest 22 presenting a U-shaped bracket portion 23 adapted to rest against the peripheral edge of the saw between the teeth. Referring to Fig. 2, the rest or bracket is shown as being secured to the plate by means of a screw bolt. Obviously, it may be made integral therewith in any approved manner. This bracket not only serves to guide the supporting plate with respect to the edge of the saw, but affords a bearing surface against the side of the saw, holding the supporting plate slightly spaced from the side of the saw so that the wheel will engage the tooth at some distance from its journaled end.

At the opposite end of the plate from the bracket or guide 22, there is shown a lug 24 of the same length as the thickness of the bracket so that the plate will rest firmly against the base of the tooth or the side of the saw when the grinder is held in operative position.

In order that the sharpener may be moved from one tooth to another and be held firmly against the side of the saw and guided with respect to it, there is shown a handle 25 conveniently made of strap metal and bent as shown in Fig. 4 so that its ends may be secured to the side of the plate by means of bolts or rivets or both.

In the practical application of the improved sharpener, it is only necessary for the operator to guide the grinding wheel so that it engages the teeth and produces an arcuate cutting edge. By manipulating the handle, the operator may bring more or less pressure against the teeth while holding the supporting plate against the side of the saw. As soon as the band file or other sharpening cylinder becomes worn, it is only necessary to remove it from the mandrel and replace it with a new one.

From the foregoing description, it will be seen that this invention provides a very simple sharpening device or attachment for circular saws which can be manufactured very cheaply and which grinds or sharpens the teeth very accurately.

Obviously the present invention is not restricted to the particular emboidment thereof herein shown and described. Moreover, it is not indispensable that all the features of the invention be used conjointly, since they may be employed advantageously in various combinations and sub-combinations.

What is claimed is:—

1. A sharpener for circular saws comprising, in combination, an elongated sheet metal plate having a lateral lug adjacent to one end; a band file having a handle journaled in the plate; a hook-shaped member secured to the plate on the end opposite from said lug and adapted to engage the edge of the saw; and a sheet metal, bail-shaped handle secured to the plate on the opposite side from said band file.

2. A sharpener for removable teeth of circular saws comprising, in combination, a frame including an elongated plate having a lateral spacer lug at one end and a hook-shaped member near the other end adapted to engage the edge of a saw; a mandrel having a shaft extending through and journaled in said plate; a band file secured to the mandrel; a crank handle removably secured to the mandrel to rotate the band file; and a substantially bail-shaped handle secured to the plate on the opposite side from said band file.

In testimony, that I claim the foregoing as my own, I have hereto affixed my signature.

CHARLES V. EAST.